(12) United States Patent
Metcalf et al.

(10) Patent No.: US 6,554,936 B1
(45) Date of Patent: Apr. 29, 2003

(54) METHOD OF CONSTRUCTING INSULATED METAL DOME STRUCTURE FOR A ROCKET MOTOR

(75) Inventors: Gary S. Metcalf, Salt Lake City, UT (US); William E. White, Sandy, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/391,979

(22) Filed: Sep. 8, 1999

(51) Int. Cl.[7] .......................... B65H 81/00; B32B 31/00
(52) U.S. Cl. ...................... 156/172; 156/169; 156/187; 156/192; 60/253; 60/255; 523/138
(58) Field of Search ................................. 156/169, 172, 156/173, 175, 184, 187, 192, 194; 523/138; 60/255, 253

(56) References Cited

U.S. PATENT DOCUMENTS

| | | | |
|---|---|---|---|
| 3,597,821 A | | 8/1971 | Emerson |
| 3,663,496 A | * | 5/1972 | Whelan ...................... 523/138 |
| 4,429,634 A | | 2/1984 | Byrd et al. |
| 4,458,595 A | | 7/1984 | Gerrish, Jr. et al. |
| 4,492,779 A | | 1/1985 | Junior et al. |
| 4,501,841 A | * | 2/1985 | Herring ...................... 524/411 |
| 4,600,732 A | | 7/1986 | Junior et al. |
| 4,601,862 A | | 7/1986 | Byrd et al. |
| 4,649,823 A | | 3/1987 | Bell |
| 4,663,065 A | * | 5/1987 | Herring ...................... 60/253 |

(List continued on next page.)

FOREIGN PATENT DOCUMENTS

| | | |
|---|---|---|
| DE | 38 00 064 | 7/1989 |
| DE | 41 32 415 | 3/1993 |
| FR | 1 360 411 | 8/1964 |
| FR | 2 144 071 | 2/1973 |
| GB | 1044765 | 10/1966 |
| JP | 8-134327 | * 5/1996 |
| JP | 10-330583 | * 12/1998 |
| WO | 94/25267 | * 11/1994 |

OTHER PUBLICATIONS

Lyda Y, Phyllis, "BORON", Mineral Yearbook, USGS, 1995, pp. 1–11.*
Search Report dated Jun. 12, 2001.
PCT International Search Report of Aug. 14, 2001.
Final Report, Poseidon C3 Phase II: Propulsion Test Program Fleet Ballistic Missile System. Report No. 10. Section II only. Jul.1, 1971 (Unclassified).
Molding Compound, Rubber, Butadiene Acrylonitrile, with Phenolic and Boric Acid, Compounding of Polaris Fleet Ballistic Missle, *Department of the Navy: Bureau of Naval Weapons*. Oct. 13, 1966. (Unclassified).

*Primary Examiner*—Jeff H. Aftergut
(74) *Attorney, Agent, or Firm*—TraskBritt (57) ABSTRACT

An elastomerized phenolic resin ablative insulation particularly suitable for use in connection with the thermal insulation of selected components of rocket motors. A composition for making the elastomerized ablative insulation is disclosed. Furthermore, an associated method of forming calendered sheets of material formed of the composition is disclosed. The preferred ingredients of the disclosed composition include acrylonitryle butadiene rubber, zinc borate, and phenol formaldehyde resin which can be cured and bonded to structures such as domes of open-ended rocket motors and other rocket motor components. The subject elastomerized ablative insulation is well suited for use independently or in connection with other insulative materials to form a thermal barrier which is highly resistant to the heat and the erosive nature associated with the combustion of propellant fuels, for example.

27 Claims, 6 Drawing Sheets

U.S. PATENT DOCUMENTS

| | | |
|---|---|---|
| 4,663,196 A | 5/1987 | Byrd et al. |
| 4,666,084 A | 5/1987 | Mitchell et al. |
| 4,736,684 A | 4/1988 | Byrd et al. |
| 4,803,019 A | 2/1989 | Graham et al. |
| 4,820,576 A * | 4/1989 | Duryea ....................... 428/246 |
| 4,878,431 A * | 11/1989 | Herring ....................... 102/290 |
| 4,956,397 A | 9/1990 | Rogowski et al. |
| 4,959,110 A | 9/1990 | Russell |
| 5,031,539 A | 7/1991 | Hutchens |
| 5,098,277 A | 3/1992 | Petty |
| 5,174,845 A | 12/1992 | Petty |
| 5,212,944 A | 5/1993 | Martin et al. |
| 5,273,785 A | 12/1993 | Sinclair et al. |
| 5,336,343 A | 8/1994 | Hamilton et al. |
| 5,352,312 A | 10/1994 | Guillot |
| 5,359,850 A | 11/1994 | Prescott |
| 5,366,572 A | 11/1994 | Hamilton et al. |
| 5,377,593 A | 1/1995 | Boothe et al. |
| 5,380,570 A * | 1/1995 | Sayles ....................... 60/255 |
| 5,399,599 A | 3/1995 | Guillot |
| 5,498,649 A | 3/1996 | Guillot |
| 5,762,746 A | 6/1998 | Hartwell et al. |
| 5,767,221 A | 6/1998 | Poulter et al. |

\* cited by examiner

METHOD OF CONSTRUCTING INSULATED
METAL DOME STRUCTURE FOR A
ROCKET MOTOR

BACKGROUND OF THE INVENTION

1. Field of the Invention

The present invention relates generally to materials and methods used to insulate structures from high temperatures and pressures generated during the combustion of fuels. The present invention is particularly suitable for insulating structures, including, but not limited to, dome structures, nozzle structures, and igniter structures of rocket motors, such as solid propellant rocket motors used in the aerospace industry.

2. State of the Art

Solid propellant rocket motors have a center bore and/or cavity in the aft end of the motor in which combustion products of the solid propellant flow and are directed through the throat of a nozzle. Combustion occurs on the surface of the propellant and the resulting combustion products, upon passing through the throat, expand and are expelled from the exit cone of the nozzle located at the aft-most end of the motor. Combustion products are accelerated from subsonic velocities at high pressure within the rocket motor to supersonic velocities at near ambient pressure as the combustion products pass through the exit cone of the nozzle. The very high velocities at which the combustion products have been accelerated and directed by way of the rocket motor provide the thrust needed to propel the craft, or spacecraft, to which the rocket motor or motors are mounted.

Open-ended solid propellant rocket motors typically have a much larger cavity in the aft end of the motor, referred to as the aft dome. The open-ended design is used to facilitate and ease the retraction of mold tooling used in forming the internal geometry of the propellant grain within the rocket motor. With open-ended rocket motors, combustion products can impinge directly on the aft dome at velocities exceeding 300 feet per second (91 m/s) before exiting the nozzle.

Because of the high temperatures and pressures at which propellant fuels burn, typically of the magnitude of 5000° F. (2760° C.) and 1500 PSI (10,341 KPa), it is necessary to provide the internal surface of such rocket motor domes, as well as other components and portions of the motor, with a thermally insulating material that can withstand the impingement of high-velocity gases and oxidized, or partially burned particles of fuel. The structure of the aft dome is typically made of aluminum, an alloy steel, or a fiber-resin composite and would quickly rupture if directly exposed to the high-velocity, high-temperature combustion gases and oxidized particulates. The insulating material also serves to contain and protect the immediately surrounding area of the motor from the large amount of heat generated by the rapid combustion of propellant fuels. Thus, the insulating material must not only be capable of withstanding the impact of high-velocity gases and particulates, which are very erosive to insulating materials, but must also be able to withstand being subjected to high temperatures and high pressures upon the firing of the rocket motor.

Rocket motors have a nozzle exit cone, which directs the burning gas out of the motor and away from the craft. Such exit cones can be a fixed-type cone, which is typically immovably mounted to the aft or rearward portion of the dome. Alternatively, and frequently, the exit cone can be a variable-angle or vectorable-type cone which is pivotably mounted to the aft portion of the dome so that the exit cone can be moved angularly within a selected range to vector, or steer the craft in which the motor is installed, thus providing more directional control of the vehicle. Typically, the exit cone of a vectorable-type nozzle can be vectored within a range of 0 degrees to 10 degrees. The exit cone, whether a fixed-type or a vectorable-type, is typically attached directly to the aft portion of the dome and is often canted at a preselected angle from the centerline, or longitudinal axis, of the motor. This is particularly true when the motor is configured as a strap-on booster rocket to provide increased launch capacity for a primary or core space vehicle. A cant angle of up to 10 degrees from the centerline, or longitudinal axis, of the motor is frequently used. However, other cant angles can be used as necessary. The cant is often necessary in crafts having multiple booster rockets, and is required to direct the exiting flame away from the centerline of the craft to prevent overheating or scorching of the craft itself or of adjacently mounted motors.

Thus, the dome of an open-ended rocket motor as well as the insulation contained within the interior of the dome must be configured so as to allow the exit cone of the motor to be canted at a preselected angle and/or vectorable within a preselected range of angles. The cant and/or sustained vector at a given angle gives rise to increased char in the aft dome as gases are turned to exit through the nozzle throat. The effect of the nozzle cant also results in higher manufacturing costs due to more complex machining, additional labor, and material scrap.

The art in the past utilized domes, typically made of a preselected metal alloy, in which two to three preformed rings of tape-wrapped carbon phenolic insulation were bonded into position in a consecutive fashion within the dome to form a thermally insulating barrier therein. Tape-wrapped carbon phenolic insulation has been used in the past to minimize inert weight due to increased thickness and because of its ability to withstand the mechanical and thermal erosion attributable to direct impingement of combustion products on the open-ended aft dome. Each of these rings were usually manufactured separately because of the complex geometry of sequentially increasing diameters in order to be fitted within the dome at a proper station. The hollow done likewise increases in diameter as viewed from the aft position, or nozzle end, of the motor, and moving forward or away from the exit cone toward the dome where propellant fuel is undergoing combustion.

Figure 1:
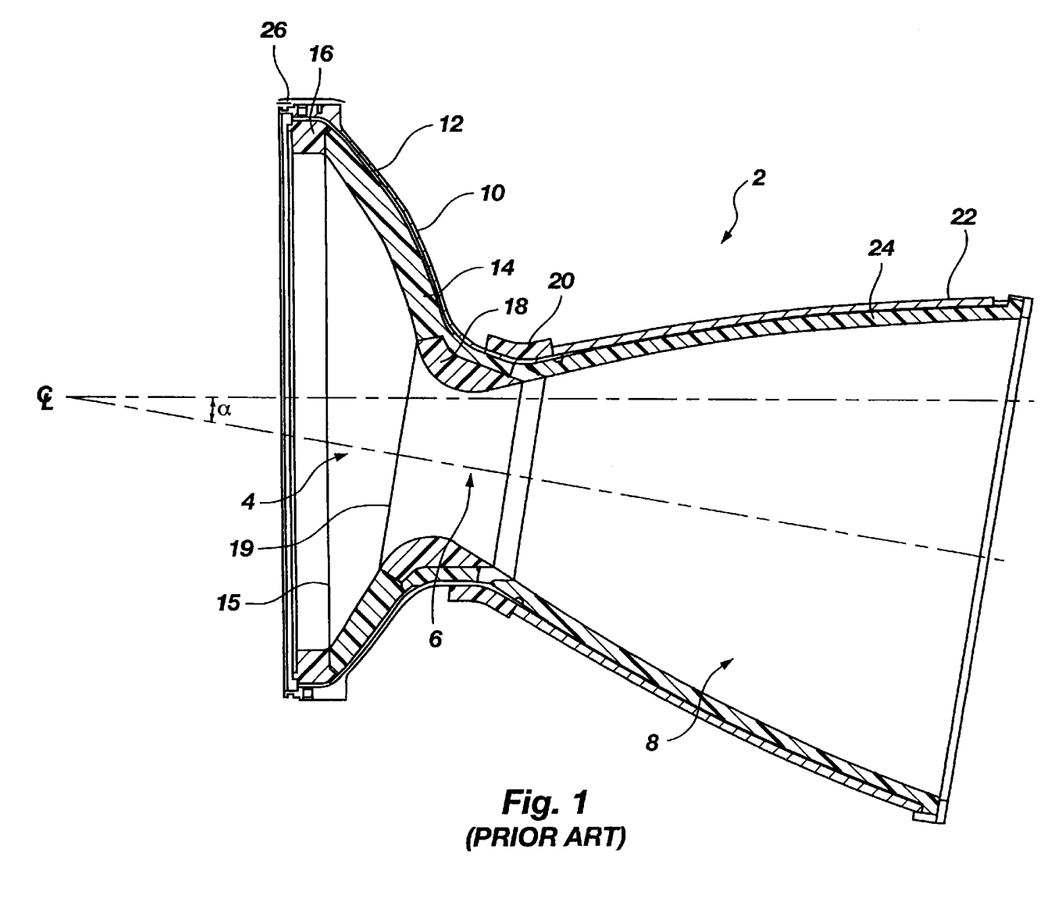
FIG. 1 is a cross-sectional view of a prior art open-ended rocket motor having an insulated dome and a fixed-type exit cone.
Figure 2:
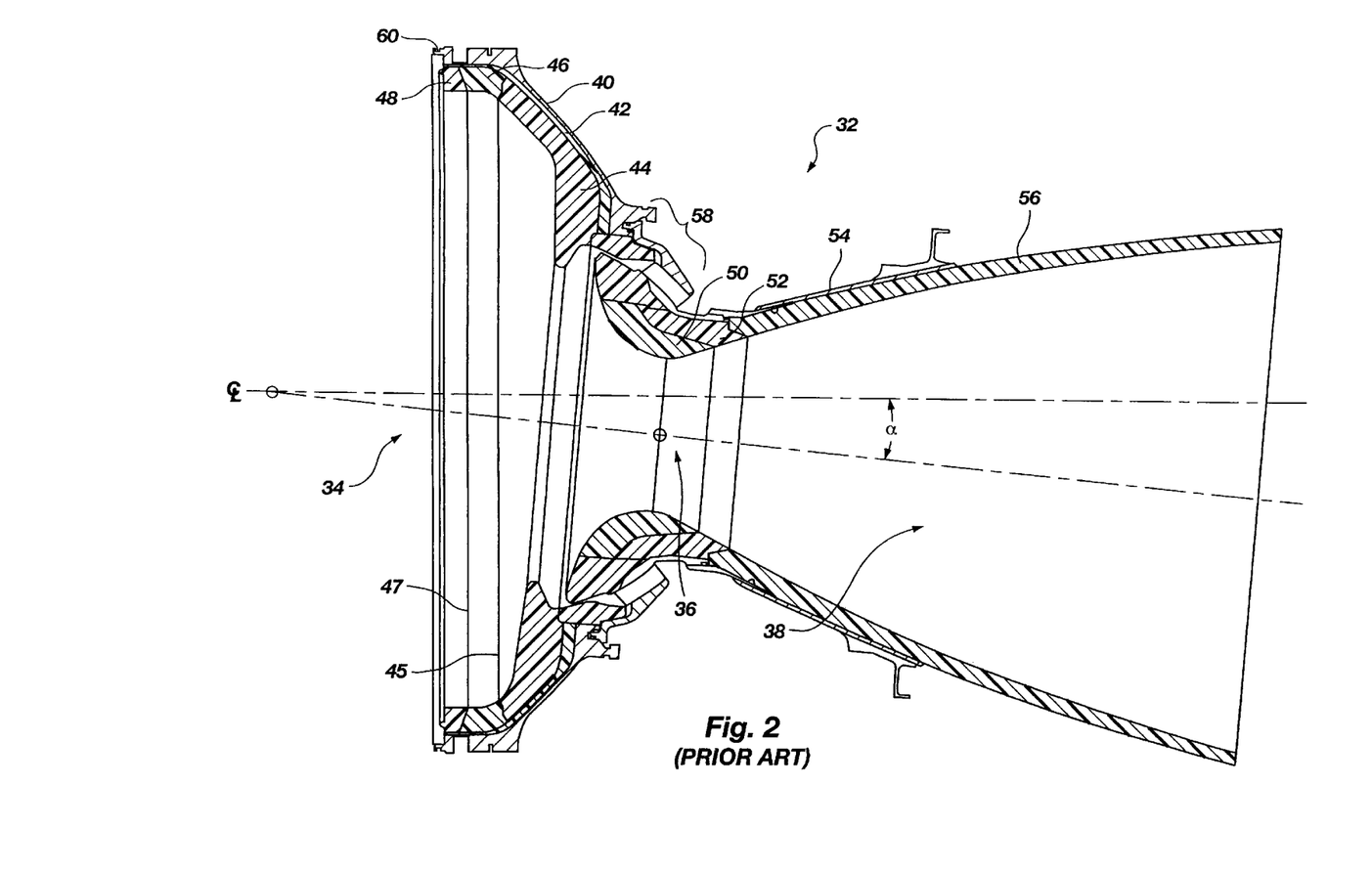
FIG. 2 is a cross-sectional view of a prior art open-ended rocket motor having an insulated dome and a vectorable-type exit cone.

In order to better understand and appreciate the present invention, reference is made to exemplary prior art insulators installed in the domes of open-ended solid propellant rocket motors shown in FIGS. 1 and 2. FIG. 1 depicts an open-ended aft dome and nozzle of a motor having a fixed-type exit cone, whereas FIG. 2 depicts the open-ended dome and nozzle of a motor having a vectorable-type exit cone.

More particularly, motor 2 depicted in FIG. 1 is provided with a dome shell 10 which generally encases an open dome region 4 and a nozzle throat region 6, and an exit cone shell 22 which generally encases an exit cone region 8. Dome shell 10 is typically a shell made of a pre-selected metal alloy and includes a flange portion 26 for allowing the dome shell 10 to be sealed and secured to the motor chamber case (not shown). Exit cone shell 22 is also typically made of a metal alloy and exit cone insulative liner 24 is typically made of a tape-wrapped carbon fiber/phenolic composite material. The cant, or angle, at which the dome shell 10 must be configured in order to allow exit cone shell 22 to extend away from the horizontal longitudinal centerline of the motor is designated as angle α. As mentioned previously, angle α can range from 0 to about 10 degrees, but α can be any suitable angle.

As can be seen in FIG. 1, nozzle throat region 6 is defined by an integral throat entry (ITE) 18 which is typically formed of a three-directional or four-directional tape-wrapped carbon-carbon composite material and is externally supported by a nozzle throat insulator 20 typically formed of a unidirectional tape-wrapped carbon fiber/phenolic material.

It can further be seen in FIG. 1 that open dome region 4 is defined by aft dome insulator 14 which lines the more aft portion of dome shell 10 back to the integral throat entry 18. Forward dome insulator 16 abuts with aft dome insulator 14 at joint interface 15 and insulatively lines dome shell 10 from joint interface 15 forward to flange portion 26. Located behind dome insulators 14 and 16 and thus between dome insulators 14 and 16 and the interior surface of dome shell 10 is a shear-ply layer 12. Shear-ply layer 12 is typically formed of an elastomeric material containing either silica powder or aramid fibers (e.g., fibers made of Kevlar® material) and a curable polymer such as ethylene propylene diene monomer (EPDM), which is commercially available from a number of sources. Shear-ply layer 12 provides a cushion between the somewhat rigid dome insulators 14 and 16 and the inner surface of dome shell 10 upon firing the rocket motor.

The construction of dome shell 10, shear-ply layer 12, aft dome insulator 14, and forward dome insulator 16 is generally as follows. Shear-ply layer 12 is typically hand laid into essentially the full inner surface of dome shell 10 by cutting and trimming calendered sheets into the proper size and configuration so as to conform tot he inner surface of dome shell 10. A bonding system such as Chemlok® 205 primer and Chemlok® 236 adhesive available from the Lord Corp. is used to ensure a proper bond between the shear-ply layer 12 and the inner surface of dome shell 10. Upon shear-ply layer 12 being properly laid and trimmed to fit the inner contour of dome shell 10, the shear-ply layer and dome shell are vacuum bagged and autoclaved to cure and bond shear-ply layer 12 onto the inner surface of dome shell 10. After being cured, the exposed surface of shear-ply layer 12 is machined to a final contour and surface finish suitable for accommodating the insulating material to be bonded thereto.

Dome insulators 14 and 16 are made in accordance with previously known materials and methods, and are first formed by laying down or wrapping a tape comprising carbonized rayon fibers that have been impregnated with, for example, a phenol formaldehyde resin about a work mandrel having a preselected contour and size which corresponds to the inner surface of the respective insulator. Such tape or tape wrap material is commonly referred to within the art as tape-wrapped carbon phenolic composite material. Such tape-wrapped carbon phenolic material is difficult to manufacture and is increasingly difficult to obtain commercially due to prior sources ceasing to manufacture the subcomponents of such material, or such sources no longer being in business. Such precursor tape was originally manufactured by North American Rayon Corp. (NARC), a fiber manufacturing subsidiary of North American Rockwell Corp. in which the subsidiary is no longer in business. The fiber tape upon having been carbonized and impregnated with phenolic resin (Fiberite product number MX 4926) sells for over US$100.00 per pound (US$220/Kg), but there is no U.S. supplier currently manufacturing such tape. A multiyear supply of the carbon fiber precursor was purchased and stockpiled by many companies when NARC announced their plans to cease production of the precursor fiber. Alternatively, rayon fiber is available from CYDSA Corporation, a Mexico-based supplier for which the mandatory qualifications and certifications have not yet been fully conducted in order to be approved as a certified vendor within the industry. However, once suitable and properly qualified rayon fiber has been obtained, the rayon fiber must first be woven into cloth or tape, and further must be carbonized by a skilled, and often difficult to locate, carbonizing facility prior to being impregnated with a phenol formaldehyde resin. Such a resin is available either from Borden Corp. as part no. SC1-008 or Ashland Chemical Corp. as part no. 91LD. One facility used in the past for impregnating the carbon fiber with phenolic resin has been Fiberite Corp of Winona, Minn. However, as a practical matter, it is very difficult to orchestrate and ensure that such carbon resin composite material is properly prepared to provide an end product of suitable quality.

Attempts at incorporating an alternate carbonized fiber precursor, polyacrylonitrile (PAN), have been unsuccessful, in spite of good erosion resistance and adequate thermal performance. The PAN fibers when woven into tape and impregnated with phenolic resin suffer from inferior mechanical properties (i.e., low inter-laminar cross-ply and shear strength).

After the carbon fiber has been carbonized and impregnated with a phenolic resin, it is initially wrapped about respectively sized mandrels to individually preform insulators 14 and 16. The mandrels carrying respective tape-wrapped insulator preforms are vacuum bagged and the insulator preforms are then autoclave cured. Upon being autoclave cured, or alternatively hydroclave cured, individually sized and configured insulators 14 and 16 are removed from their respective mandrels. Thereafter, the hollow, bowl-shaped insulators are machined in order to configure the back, or outer surface, of each insulator to have a contoured matching dome shell 10 with shear-ply layer 12 previously installed therein. Additionally, the joint interfaces, such as joint interfaces shown as 15 and 19 in FIG. 1, are machined so as to provide a proper surface for being cooperatively abutted against adjacent insulators within dome shell 10. This machining process is quite expensive in terms of machining time, associated skilled labor, and the amount of material to be removed and hence simply scrapped. This machining expense is especially amplified with respect to the construction of aft insulator 14 which must be extensively machined in order to provide the final contour needed to allow nozzle throat region 6 and exit cone region 8 to be canted at a selected angle α. Upon examining the lower portion of open dome region 4 of FIG. 1, it can be seen that the larger diameter insulator 16 is generally symmetrical about the longitudinal centerline of the motor. However, smaller diameter insulator 14 is asymmetrical about the longitudinal centerline in order for the nozzle throat region 6 defined by integral throat entry 18 and exit cone region 8 defined by exit cone shell 22 and exit cone insulative liner 24 to extend downwardly to provide the required cant angle α. This asymmetrical configuration of insulator 14 requires that an extensive amount of material be machined from the preform of insulator 14 because the preform may only be initially formed as a symmetrical workpiece in order for the resin-impregnated carbon fiber tape to be properly laid down on the mandrel. In other words, insulator 14 must first be made as a symmetrical, hollow bowl with the center missing, then a large portion of the backside of the preformed bowl must be removed (ranging upwards of 50% of the original material) by expensive and difficult multi-axis machining in order to provide the insulator having the necessary cant or angled configuration to match the interior of dome shell 10 and previously installed shear-ply layer 12.

Upon the respective joint interfaces and backsides of dome insulators 14 and 16 having been machined, insulator 14 is first installed and bonded into dome shell 10 against the inner facing surface of shear-ply layer 12 and longitudinally positioned against integral throat entry 18. A structural epoxy adhesive, such as EA-934NA or EA-9394 available from Hysol-Dexter, Pittsburgh, Calif., is typically used for such bonding of insulator 14 to shear-ply layer 12 and at the bonding interface between the aft edge of insulator 14 and forward edge of integral throat entry 18. Upon insulator 14 having been positioned into place within dome shell 10, larger diameter insulator 16 is then installed and bonded to the remaining exposed portion of shear-ply layer 12 and against the forward edge of aft insulator 14 to form a bonded joint interface 15, also referred to as a secondary bond line, between the two adjoining edges of insulators 14 and 16. Typically, the same epoxy adhesive, such as the previously mentioned EA-934NA or EA-9394, is also used as a bonding agent for the backside of bonding insulator 16 against the inwardly facing surface of shear-ply layer 12 and at the joint interface 15 between the aft edge of insulator 16 and the forward edge of insulator 14. Dome insulators 14 and 16 are fully cured and bonded to shear-ply layer 12, which was previously bonded into dome shell 10. Lastly, the inner surfaces of dome insulators 14 and 16 are machined to the final contour and surface finish which open dome region 4 is to have. Thereafter, the completed dome assembly is ready to be installed as a major subcomponent of a rocket motor to which other components can now be secured, including exit cone assembly 22/24.

Referring now to FIG. 2 of the drawings, illustrated is an open-ended rocket motor 32 having a vectorable-type, or movable, exit cone. Motor 32 has a dome region 34 defined by dome shell 40 having three dome insulators, referred to as aft insulator 44, middle insulator 46, and forward insulator 48. Motor 32 is further provided with an integral throat entry 50 and a throat support insulator 52. Located about the outer circumference of the throat region is a pivoting mechanism 58 which allows exit cone assembly 54/56 to be pivoted within a preselected range. As with motor 2, shown in FIG. 1, dome shell 40 having a flange portion 60 is typically formed of a metal alloy and is configured to allow nozzle throat region 36 and exit cone region 38 to be canted at a preselected angle α with respect to the longitudinal centerline of motor 32.

Other than there being three dome insulators 44, 46 and 48 positioned in an end-to-end consecutive manner, such as at joint interfaces 45 and 47, and the three dome insulators 44, 46 and 48 bonded against the inner surface of shear-ply layer 42 bonded within dome shell 40 of motor 32, as compared with only two dome insulators being bonded to a shear-ply layer 12 in the dome shell of motor 2, the previously discussed materials and procedures for constructing and installing shear-ply layer 42 and dome insulators 44, 46, and 48 within dome shell 40 are essentially the same as for shear-ply layer 12 and dome insulators 14 and 16. As with asymmetrical aft dome insulator 14 of the motor shown in FIG. 1, asymmetrical aft dome insulator 44 of the motor shown in FIG. 2 must also have extensive multi-axis machining performed thereon in order for insulator 44 to be properly configured to accommodate the cant angle of nozzle throat region 36 and exit cone region 38. However, because three dome insulators are preferred, if not required, for motors designed to have a canted and/or vectorable-type exit cone, the associated manufacturing, labor, and material scrap rate are thus increased proportionally.

In closed-ended rocket motors, the propellant fuel fills a majority of the aft dome cavity, thereby resulting in a "closed-ended" motor geometry as compared with an "open-ended" motor geometry as previously discussed and shown in FIGS. 1 and 2. In closed-ended rocket motors, the propellant fuel is bonded directly to the insulation material and/or an elastomeric liner, or stress-relief flap, which is in turn bonded to the insulation material. A material used in the past for insulating chambers of rocket motors for forming internal insulation of structures incorporated in closed-ended rocket motors is set forth in Table 1-1 of an unclassified Department of the Navy data sheet entitled Molding Compound, Rubber, Butadiene Acrylonitrile, with Phenolic and Boric Acid, Compounding of, First Revision dated Oct. 13, 1966, and as changed on Sep. 21, 1967. For convenience, such table is set forth in Table 1:

TABLE 1

(Prior Art)

| Ingredients | Parts by Weight (PBW) |
| --- | --- |
| Hycar 1051 (Butadiene Acrylonitrile Elastomer) | 100 |
| BKR 2620 (Phenolic Resin) | 120 |
| Boric Acid (Powdered) | 80 |
| Stearic Acid | 2 |
| TMTD (Tetramethyl Thiuram Disulfide) | 3 |
| Zinc Oxide | 5 |

Note: All ingredients measured prior to mixing, each ingredient subject to a plus or minus 2 percent tolerance.

Formulations for rubbers are typically called out in parts by weight (PBW). The vulcanizable rubber portion of the formulation (in this case the Hycar 1051) is arbitrarily given a PBW of 100 and all other ingredients are called out as PBW in a level relative to the 100 PBW of the vulcanizable rubber.

The above-listed ingredients needed to make the subject prior art molding compound are available commercially and the process of combining such ingredients is further set forth in the subject data sheet, incorporated herein by reference. Insulative material formed from the above molding compound was specifically designed, tested, and approved to be used as insulating material in closed-ended motors in which the subject insulating material needed particular characteristics compatible with the propellant fuel to be bonded thereto. Furthermore, it is known within the art that this molding compound has been used to form nozzle stationary shell insulators similar to insulator 182 in FIG. 6 and as indicated in Section II of an unclassified Department of the Navy document of the Poseidon C3 Propulsion Test Program (Document No. SH050-A2A01HTJ, Report No. 10 dated Jul. 1, 1971). The prior art material cited in Table 1 hereof was used as a stationary shell insulator for the Poseidon Second Stage Motor design.

Materials originally designed, tested, and approved for closed-ended motors, such as in Table 1 herein, have not generally been investigated for use in open-ended motors due to differing design constraints between closed-ended and open-ended motors. When incorporated in closed-ended rocket motor designs, the material in Table 1, herein, was subjected to tightly controlled pre-ignition environments and limited to motor ignition temperatures greater than 70° F. (21° C.) because of concerns with strain capability at low temperatures.

Open-ended motor firing environments for this invention range from 30° F. to 100° F. The severe thermo-mechanical erosive environments typical of the aft dome of an open-ended rocket motor result in increased insulation thickness and, hence, additional inert weight, in order to adequately protect the aft dome structure. For those elastomeric materials with superior erosion resistance, such as the material cited in Table 1 herein, problems with batch and product reproducibility and consistency, manufacturing defects (voids) and insulator cracking due to aging were deemed higher risk options and unacceptable for an open-ended rocket motor production program.

The following documents are exemplary of rocket motor insulators known within the art:

U.S. Pat. No. 4,492,779, issued to Junior et al. and entitled Aramid Polymer And Powder Filler Reinforced Elastomeric Composition For Use As A Rocket Motor Insulation, is directed to a process for insulating solid propellant rocket motors with a composition comprising aramid fibers, a powder filler, and vulcanizable elastomeric composition;

U.S. Pat. No. 4,600,732, issued to Junior et al. and entitled Polybenzimidazole Polymer And Powder Filler Reinforced Elastomeric Composition For Use As A Rocket Motor Insulation, is directed to an elastomeric composition comprising polybenzimidazole polymer fibers, a powder filler and a vulcanizable elastomeric composition;

U.S. Pat. No. 4,458,595, issued to Gerrish Jr. et al. and entitled Ablative Liner, is directed to an end-burning rocket motor having a first layer of silicone rubber and a second layer of an ablative lining placed between the rocket motor casing and the propellant grain; and U.S. Pat. No. 4,956,397, issued to Rogowaski et al. entitled Insulating Liner For Solid Rocket Motor Containing Vulcanizable Elastomer And A Bond Promoter Which Is A novolac Epocy Or A Resole Treated Cellulose, is directed to an insulating liner for a solid rocket motor having a vulcanizable elastomeric composition, powder filler, and a cellulosic bond promotor.

Additionally, the inventors of the present invention are aware of the following U.S. patents:

U.S. Pat. No. 5,352,212, issued to Guillot and entitled Method of Insulating a Rocket Motor, is directed to compositions of insulations containing thermoplastic liquid crystal polymers, fibers, and particulate fillers;

U.S. Pat. No. 5,399,599, issued to Guillot and entitled Thermoplastic Elastomeric Internal Insulation for Rocket Motors for Low Temperature Applications, is directed to compositions of insulations containing thermoplastic elastomers, an inorganic phosphorus compound, a polyhydric alcohol, a silicone resin, and chopped fibers;

U.S. Pat. No. 5,498,649, issued to Guillot and entitled Low Density Thermoplastic Elastomeric Insulation for Rocket Motors, is directed to compositions of insulations containing thermoplastic elastomers, a maleic anhydride modified EPDM, and carefully selected fillers and chopped fibers; and U.S. Pat. No. 5,762,746, issued to Hartwell, et al. and entitled Method of Internally Insulating a Propellant Combustion Chamber, is directed to compositions containing polyphosazene polymer and organic fiber filler.

Thus, it can be appreciated that there is a need within the art for an insulating material having ingredients that can be readily and economically obtained and that can be readily formed and bonded into selected structures of rocket motors more efficiently and more cost effectively, as compared to previously known materials and methods.

It can further be appreciated that there is a need within the art for an insulating material that can withstand the high temperatures, high pressures and high particulate velocities encountered in the burning of propellant fuels in rocket motors without a substantial burden in increased inert weight to protect dome structures and adjacent motor components and the craft.

Another need within the art is the ability to construct insulators which are to be positioned within selected structures and components of rocket motors, particularly those of asymmetric configuration, while minimizing the number and complexity of steps required to perform such insulators. Furthermore, there is a need to minimize the amount of scrap or wasted material in constructing such insulators as well as to minimize the amount of difficult and expensive multi-axis machining needed to construct such insulators.

There is yet a further need within the art for an insulating material having particular ablative qualities as well as having a coefficient of thermal expansion and strain modulus particularly suitable for thermally insulating certain components of open-ended rocket motors and which can be obtained at a significantly lower cost as compared to previously known insulative materials.

Another need within the art is for an insulating material that has favorable aging characteristics, i.e., once an insulator is constructed, it may be several years before the rocket motor in which the insulator is incorporated is actually fired. Thus the art would benefit from having insulating materials having improved aging characteristics.

Yet another need within the art is for an effective insulating material in which the compound forming such insulating material is easier to mix, has uniformly dispersed ingredients, and repeatedly provides insulative products of consistently high quality.

SUMMARY OF THE INVENTION

The present invention provides a method of insulating a structure of a rocket motor having at least one surface on which an ablative insulative material is to be disposed. The method includes disposing at least one layer of curable ablative insulative material on at least one surface of the selected structure. The insulative material is generally formed of a vulcanizable rubber, a flame retardant such as zinc borate, a phenolic resin and a cure system constituent, and may optionally have reinforcing fibers therein. The method preferably includes the insulative material being formed of a compound including, but not limited to, the following ingredients: acrylonitrile butadiene rubber, zinc borate, phenol formaldehyde resin, zinc oxide, tetramethyl thiuram disulfide, and stearic acid. The insulative material may optionally be provided with supportive or reinforcing fibers or fibrous elements such as aramid, cotton (cellulose), sisal, polybenzamidazole, mineral wool, nylon, polyester, or carbon fibers. The method also includes curing at least one layer of curable ablative insulative material that has been disposed on at least one surface.

The present invention additionally provides a composition for an ablative insulative elastomerized phenolic resin material generally comprising: vulcanizable rubber, a flame retardant such as zinc borate, a phenolic resin and a cure system constituent, and which may optionally have reinforcing fibers therein. Preferably, the composition comprises the following ingredients: acrylonitrile butadiene rubber; zinc borate; phenol formaldehyde resin; zinc oxide; tetramethyl thiuram disulfide; and stearic acid. Preferably, the individual ingredients have the following maximum parts by weight:

acrylonitrile butadiene rubber—100; zinc borate—80; phenol formaldehyde resin—120; zinc oxide—5; tetramethyl thiuram disulfide—3; and stearic acid—2. Preferably, a stoichiometric master batch is provided that consists of a mechanically ground and screened phenol formaldehyde resin and zinc borate wherein the zinc borate coats the ground resin and acts as a partitioning agent to prevent the ground resin from agglomerating into larger, nondispersable particles or clumps. The stoichiometric master batch offers enhanced repeatability and quality control in producing insulative materials from the disclosed composition by ensuring that the largest undispersed resin particle does not exceed 100 mesh in size.

The present invention further provides a method of constructing an internally insulated metal dome structure of an open-ended rocket motor. The method includes disposing a shear-ply layer formed of a preselected curable elastomeric material onto at least a portion of the inner surface of a dome structure and curing and bonding the shear-ply layer to a selected portion of the inner surface of the dome structure. The method further includes preforming at least one first dome insulator about a mandrel. This first dome insulator (or insulators) is preferably made of a carbon phenolic composite material comprising carbonized fibers impregnated with a preselected curable resin and generally has an outer surface and an inner surface. The first insulator is then precured. A carbon phenolic or other highly erosion-resistant and structurally stable materials is required adjacent to the integral throat entry (ITE) in order to ensure a smooth transition of combustion gases flowing into the nozzle throat region. The method further includes machining at least a portion of the first insulator to a final configuration and positioning and bonding the first insulator onto a selected portion of the inner surface of the shear-ply layer previously disposed and bonded onto the selected portion of the inner surface of the structure. The method yet further includes disposing at least one second dome insulator (or insulators) onto at least a portion of the inner surface of the dome structure longitudinally proximate to the first dome insulator, the second dome insulator being generally formed of a vulcanizable rubber, a flame retardant such as zinc borate, a phenolic resin and a cure system constituent, and which optionally may contain reinforcing fibers therein. Preferably, the second dome insulator is formed of a material formed of a composition comprising at least acrylonitrile butadiene rubber, zinc borate, a curable resin, tetramethyl thiuram disulfide, and stearic acid. Preferably, the composition is prepared by a mixing process incorporating a stoichiometric master batch of resin and zinc borate. The second dome insulator is then cured and bonded within the dome structure. Alternatively, the second dome insulator may be precured, machined to a final contour and bonded to the dome structure using an epoxy adhesive.

The present invention also provides a thermal barrier for thermally insulating a structure. The thermal barrier is positioned to insulate at least a predetermined portion of the structure and includes an ablative insulative material formed generally of a vulcanizable rubber, a flame retardant such as zinc borate, a phenolic resin and a cure system constituent, and which optionally may contain reinforcing fibers therein. Preferably, the ablative insulative material is formed of a curable compound including the following ingredients: acrylonitrile butadiene rubber, zinc borate, phenol formaldehyde resin, zinc oxide, tetramethyl thiuram disulfide, and stearic acid. The thermal barrier may also include a shear-ply layer formed of an elastomeric material positioned between the structure and a second insulative material formed of a fibrous material impregnated with a phenolic resin, wherein a portion of the ablative insulative material and a portion of the second insulative material abut against each other to form a secondary bond line therebetween.

DETAILED DESCRIPTION OF THE INVENTION

Figure 3:
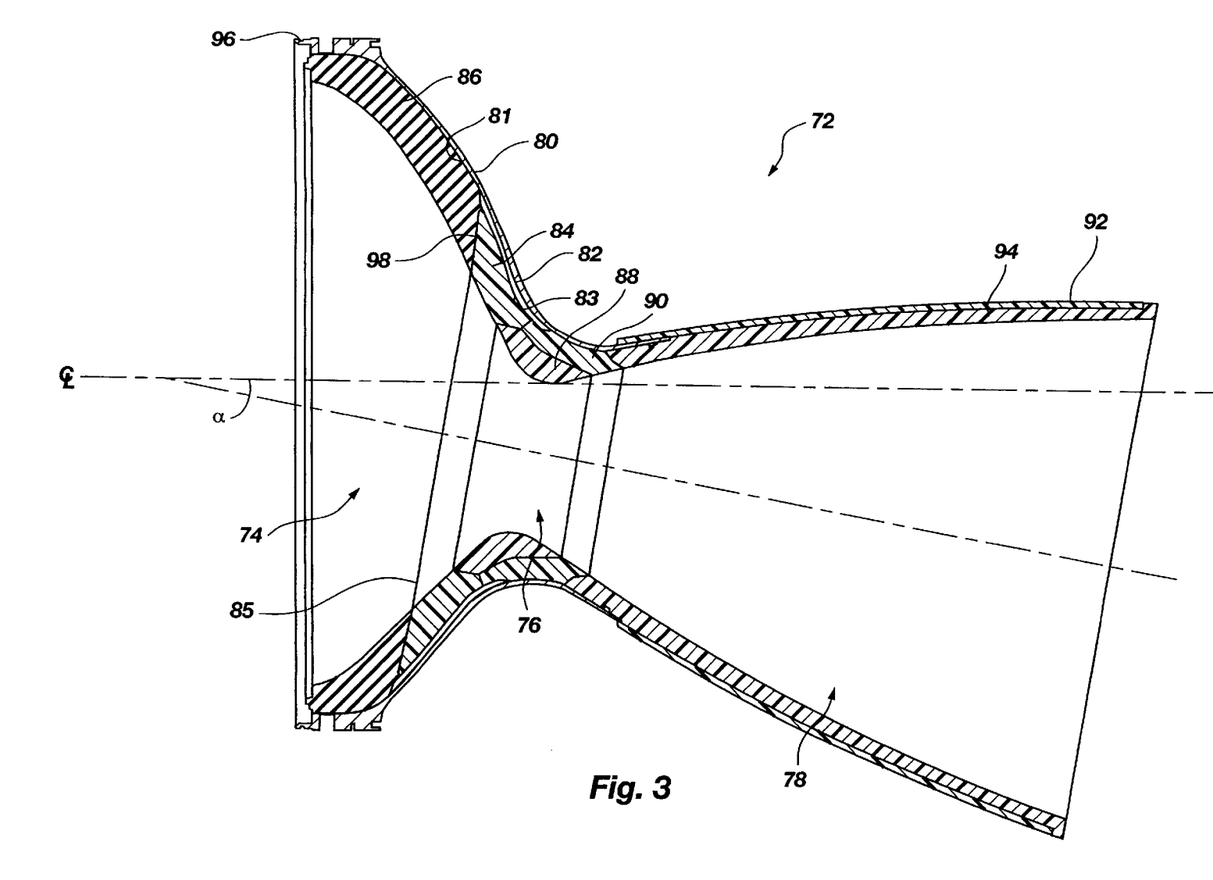
FIG. 3 is a cross-sectional view of an open-ended rocket motor having a fixed-type exit cone and an insulated dome embodying the present invention.
Figure 4:
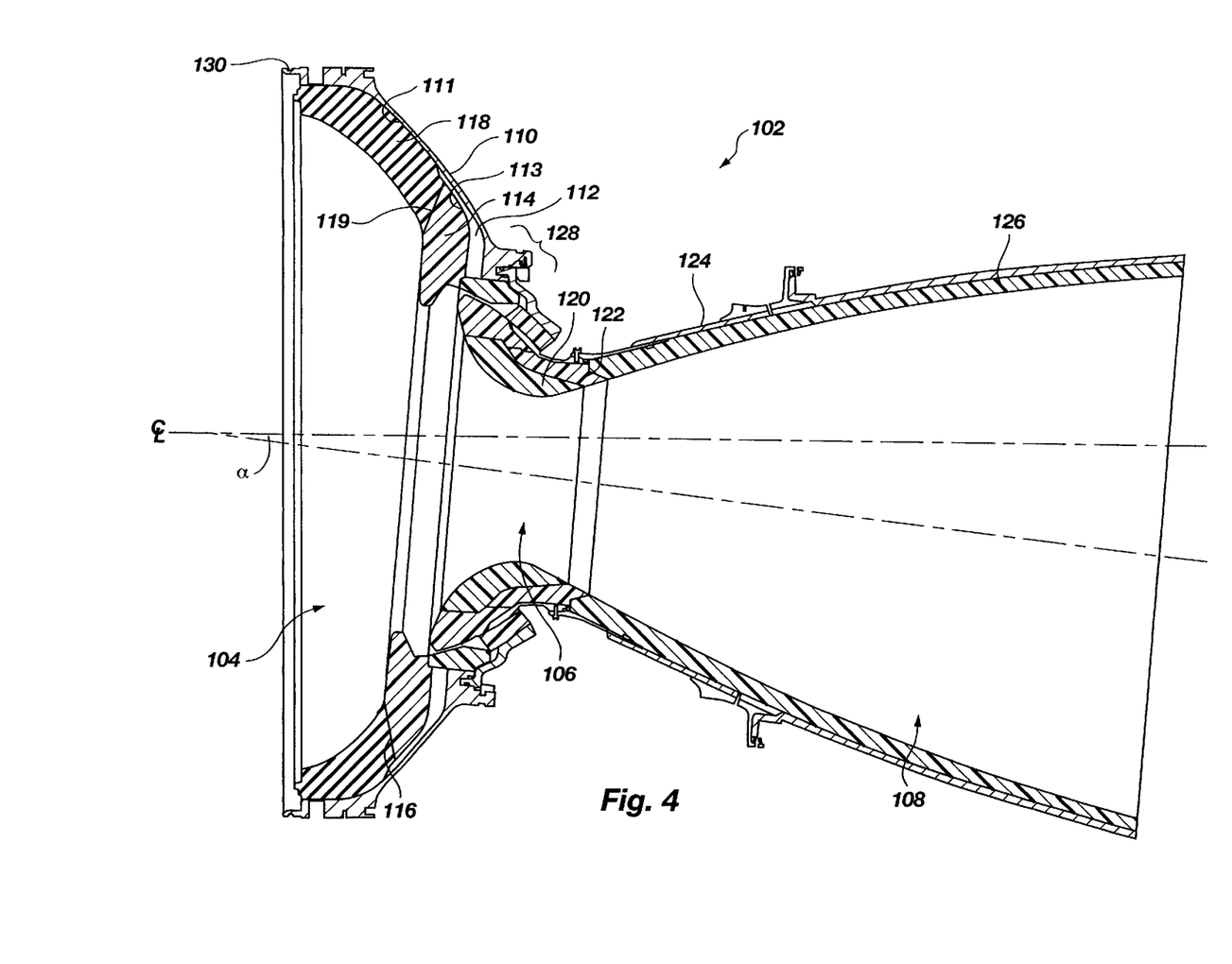
FIG. 4 is a cross-sectional view of an open-ended rocket motor having a vectorable-type exit cone and an insulated dome embodying the present invention.

FIGS. 3 and 4 of the drawings depict exemplary open-ended dome rocket motors incorporating insulation material embodying the present invention and installed within the respective dome structures, or shells, of each motor in accordance with the present invention. Motor 72, shown in FIG. 3, is provided with a fixed-type exit cone whereas motor 102, shown in FIG. 4, is provided with a vectorable-type exit cone. The exit cones, and thus the nozzles and dome shells of both motors, are canted at a preselected angle α from the longitudinal centerline of the motor. In accordance with the reasons discussed previously, this cant angle can vary from 0° to about 10°.

In reference to FIG. 3, motor 72 generally encases and defines internal dome region 74, nozzle throat region 76, and internal exit cone region 78. A dome shell, or structure 80, having a mounting flange 96, is provided with a shear-ply layer 82, an aft insulator 84, and a forward insulator 86 that are bonded to the inner surface of dome shell 80, which defines internal dome region 74. The remainder of motor 72, including nozzle throat region 76 being defined by a three-directional or four-directional woven carbon-carbon composite integral throat entry (ITE) 88, a unidirectional tape-wrapped carbon phenolic throat insulator support 90, a metal alloy exit cone shell 92 and a carbon phenolic composite exit cone liner or insulator 94 may be constructed in the same manner and of the same materials as discussed previously with respect to the exemplary prior art motor shown in FIG. 1.

Motor 102, shown in FIG. 4, similarly encases internal dome region 104, nozzle throat region 106, and exit cone region 108. A metal alloy dome shell 110, having a mounting flange 130, is provided with a shear-ply layer 112, an aft insulator 114, and a forward insulator 118 which are bonded directly or indirectly to the inner surface 111 of dome shell 110 which defines internal dome region 104. The remainder of motor 102, including nozzle throat region 106 being defined by a three-directional or four-directional woven carbon-carbon composite integral throat entry 120, a unidirectional tape-wrapped carbon phenolic throat insulator support 122, a metal alloy exit cone shell 124 and a carbon phenolic composite exit cone liner, or insulator, 126 which forms a vectorable-type exit cone assembly, pivotally attached to the aft end of dome shell 110 by pivoting mechanism 128, may be constructed generally in the same manner and of the same materials as discussed previously with respect to the exemplary prior art motor shown in FIG. 2.

In FIG. 3, shear-ply layer 82 is preferably formed of an elastomeric material containing either silica powder or aramid fibers (e.g., Kevlar® material) and a curable rubber such as ethylene propylene diene monomer (EPDM). This composition is commercially available from Burke Rubber Company in the form of calendered sheets. Shear-ply layer 82 is preferably hand laid into a selected portion of inner surface 81 of dome shell 80 by cutting and trimming calendered sheets into the proper size and configuration so as to conform to inner surface 81 of dome shell 80. A preferred bonding system of Chemlok® 205 primer and Chemlok® 236 adhesive available from Lord Corp. is used to ensure a proper bond between the shear-ply layer 82 and the inner surface 81 of dome shell 10. However, in contrast to the shear-ply layer 12 shown in FIG. 1 which is bonded essentially to the entire or full length of the inner surface of dome shell 10, shear-ply layer 82 covers significantly less of the inner surface 81 of dome shell 80 and is sized so that it protrudes only slightly beyond the forward edge of aft insulator 84 to be bonded within dome shell 80 in due course. Because less surface area of the inner surface of dome shell 80 is to be covered, considerable time and expense can be saved with respect to the installation and machining surface contours of shear-ply layer 82 compared with the more longitudinally extensive shear-ply layer 12 shown in FIG. 1. Upon shear-ply layer 82 being laid up and trimmed to properly fit the pre-selected area in which it is to be bonded within dome shell 80, the resulting assembly is then preferably vacuum bagged and autoclave cured.

Aft dome insulator 84 is preformed in much the same way as the aft dome insulator 14 shown in FIG. 1 with respect to construction steps and preferred material. That is, carbonized fiber tape impregnated with phenol formaldehyde resin, such as Fiberite tape (Fiberite Product Number MX 4926) available from the Fiberite Corp., is laid down, on and about a mandrel in order to construct a preform that is autoclave cured, or optionally hydroclave cured. Upon the preformed insulator 84 being cured, it is removed from its respective mandrel and machined to properly fit against and be received by shear-ply layer 82. However, unlike asymmetrical insulator 14 of FIG. 1, insulator 84 shown in FIG. 3 is much smaller in surface area and is also symmetrical about its longitudinal axis. Thus, insulator 84 is much easier to fabricate and takes less time to construct due to its smaller size and symmetry, plus there is not nearly as much expensive tape-wrapped material to be scrapped compared to the amount of scrap material generated in machining the asymmetrical preformed insulator 14 shown in FIG. 1. This feature of the present invention offers yet one more advantage over insulators constructed in accordance with previously known procedures.

Aft dome insulator 84, upon the outer surface thereof being properly machined and prepped, and having its forward and aft edges machined and surfaced for interfacing such edges with the aft edge of forward dome insulator 86 and the forward edge of integral throat entry 88 respectively, is fitted and bonded against shear-ply layer 82 with an adhesive such as Chemlok® 205 primer and Chemlok® 236 adhesive. Bonding interface 85, also referred to generally as a secondary bond line, which in this particular case is the circumferential position in which the aft edge of forward insulator 86 (made of rubber ablative material) abuts forward edge 98 of aft insulator 84 (made of tape-wrapped carbon phenolic composite material), is preferably precoated with an adhesive such as EA-934NA or EA-9394 available from Hysol-Dexter, Inc.

Next, calendered sheets, preferably having a width ranging up to 66 inches (approximately 168 cm) and a thickness of about 1/10th of an inch (approximately 2.5 mm) and formed from a rubber ablative material compound in accordance with the present invention to be discussed in detail further herein, are laid into dome shell 80 preferably after the inner surface of dome shell 80 is precoated with a rubber vulcanizing adhesive, such as TY-PLY BN available from the Lord Corporation, in order to form forward dome insulator 86. Because aft dome insulator 84 is symmetrically shaped, forward insulator 86 will be asymmetrical about its longitudinal axis. However, lay-up of the rubber ablative material is easily accomplished because the sheet material is preferably laid up directly into dome shell 80, and is not preformed about a mandrel and subsequently machined to a final contour allowing for the exit cone to be canted at a preselected angle. This aspect of forming forward dome insulator 86 of a pliable ablative insulative rubber sheet material, instead of a tape-wrapped carbonized fiber resin composite material which must be preformed, cured, and extensively machined, is yet another favorable attribute of the present invention.

Forward insulator 86 is laid into at least a portion of inner surface 81 of dome shell 80, and preferably covers the remaining exposed portion, or inner surface 83, of shear-ply layer 82, in which shear-ply layer 82 preferably need only extend slightly beyond the forward edge of interface secondary bond line 85 to ensure a sound bond at secondary bond line 85. Then, dome shell 80, previously installed shear-ply layer 82, and dome insulators 84 and 86, as well as previously installed integral throat entry 88 and throat insulator support 90, are vacuum bagged as one assembly and preferably cured in an autoclave for approximately 90 minutes at a temperature of approximately 290° F. (143° C.) and at a pressure of approximately 200 psig (1378 kPa).

Upon dome insulators 84 and 86 being fully cured and bonded within the dome assembly, the internal surfaces of the insulators 84 and 86 defining internal dome region 74 can now be machined to a final contour and surface finish. Thereafter, the dome assembly can be installed onto a motor chamber case (not shown) by way of mounting flange 96 and/or other sub-components of motor 72 can now be secured to dome shell 80 such as the exit cone assembly comprising exit cone shell 92 and exit cone insulator 94.

With respect to constructing and installing shear-ply layer 112, aft dome insulator 114, and forward dome insulator 118 of open-ended motor 102 having a vectorable-type exit cone shown in FIG. 4, the preferred constructions, steps, and materials employed are as previously described with respect to constructing such counterpart components of motor 72 shown in FIG. 3 resulting in bond lines at surfaces 113, 116, and 119 as shown in FIG. 4. However, it should be appreciated that aft insulator 114, preferably made of tape-wrapped carbon phenolic composite material in essentially the same manner as aft insulator 84, is preferably symmetrically shaped, instead of being asymmetrically shaped, about its longitudinal axis as is aft insulator 44 depicted in FIG. 2. Furthermore, aft insulator 114 is smaller in size than its prior art counterpart aft insulator 44, as is shear-ply layer 112 compared to its prior art counterpart shear-ply layer 42 depicted in FIG. 2. Thus, it should also be apparent that motor 32 requires three dome insulators, aft insulator 44, middle insulator 46, and forward insulator 48, whereas motor 102 need only have two insulators, a preferably symmetrical carbon phenolic composite aft insulator 114 and a preferably asymmetric rubber ablative material forward insulator 118. By thus eliminating one insulator entirely, significant manufacturing and material cost savings can be enjoyed, as well as the reduction of costs attributable to properly tracking and maintaining traceability documentation on the eliminated dome insulator. Such cost savings are also provided upon forward insulators 86 and 118 being bonded into inner surface 81 of dome shell 80 and inner surface 111 of dome shell 110, respectively, earlier in the construction process. It is no longer necessary to identify and track the preformed insulators and associated forming mandrels of the forward and middle insulators shown in FIGS. 1 and 2 of the drawings.

Alternatively, forward insulators 86 and 118 as shown in FIGS. 3 and 4, respectively, can be precured and machined to final configuration prior to installation within dome shells 80 and 110, respectively. The forward insulators can be formed to approximately final configuration by molding under vacuum using processes known within the art. Preferably, an epoxy adhesive such as EA-934NA or EA-9394 available from Hysol-Dexter, Pittsburgh, Calif., is then used to bond the precured insulator onto shear-ply layers 82 and 112 and/or into dome shells 80 and 110, respectively.

In accordance with the present invention, it is preferred that forward dome insulators 86 and 118, for example and without limitation, be made from calendered sheet stock comprised of the following ingredients set forth in Table 2:

sources for providing some or all of the individual raw ingredients needed to form the above compound.

Generally, the following procedure is used to ensure proper mixing, milling, and calendering of the above raw ingredients to form sheets of the subject rubber ablative insulative material.

Preferably a water-cooled Banbury mixer available from Farrel Company, Ansonia, Connecticut, is used to mix the ingredients within a preferred and stable range of temperature. Prior to mixing, the Banbury mixer is cleaned with solvent and dusted with a white pigment such as calcium carbonate to soak up any excess solvent.

Next the acrylonitrile butadiene rubber (NBR) is added to the mixer and mixed for approximately one minute. The master batch, tetramethyl thiuram disulfide, stearic acid, and zinc oxide are then added and mixed until the batch temperature reaches approximately 210° F. (99° C.) to approximately 230° F. (110° C.). After being thoroughly mixed to temperature, the batch is then dumped. Verification that the temperature of the dumped batch is within the above range is achieved by insertion of a temperature probe in the dumped batch.

The batch is then placed on a two-roll mill and quickly removed in approximately 3 foot by 4 foot (0.91 m by 1.2 m) pieces and cooled to ambient temperature by hanging on a cooling conveyor. The now-cool pieces of material are tested to ensure conformance to specification requirements.

Acceptable material is then placed on a two-roll mill to soften it and then calendered into sheets of about 1/10 inch (2.5 mm) thickness and preferably ranging in width from about 33 inches to 66 inches (83 cm to 168 cm). During the calendering process, the NBR/phenol formaldehyde rubber sheets are provided protection for shipment and storage by application of a thin sheet of polyethylene film. The film is removed when the calendered sheets are to be formed and

TABLE 2

| Ingredient | PBW | Trade Name | Vendor |
| --- | --- | --- | --- |
| Acrylonitrile Butadiene Rubber (65 Mooney viscosity) | 100 | Krynac 40.E65 | Bayer Fibers, Organics, and Rubber Division Akron, Ohio |
| Phenol Formaldehyde Resin (120 PBW)/Zinc Borate (80 PBW) master batch | 200 | Redimix 9821 | Harwick Chemical Co. CMS Chemical Division Wynne, Arkansas |
| Zinc Oxide (low surface area) | 5 | Kadox 930C | Zinc Corp. of America Monaca, Alabama |
| Tetramethyl Thiuram Disulfide | 3 | Tuex powder | Uniroyal Chemical Co. Middlebury, Connecticut |
| Stearic Acid | 2 | Industrene R | Witco Corp. Greenwich, Connecticut |
| Total | 310 | | |

(PBW - parts by weight)

Optionally, the phenol formaldehyde resin/zinc borate master batch need not initially be prepared as a stoichiometric premixed master batch having properly proportioned subingredients of phenol formaldehyde resin and zinc borate, but it is highly preferred for quality control purposes and ease of resin dispersion. The preferred subingredients of the master batch include phenol formaldehyde resin (120 parts by weight and ground to 100 mesh) marketed under the term "BKR 2620" by Georgia Pacific Corporation, Decatur, Ga., and zinc borate (80 parts by weight) marketed under the term "Firebrake ZB" from US Borax Co., Los Angeles, Calif. Other sources may exist and be available as alternate trimmed into insulators, or other end products, made of such sheet material of the present invention.

It may be of interest to those skilled in the art that it could be necessary to modify the cross-sectional thickness of the insulative material of the present invention in comparison to tape-wrapped phenolic materials due to heat transfer or char and erosion considerations. For example, it can be readily seen that forward insulators 86 and 118 respectively illustrated in FIGS. 3 and 4 are significantly thicker in cross section than forward insulators 16 and 48 illustrated in FIGS. 1 and 2. This consideration should be taken into account when designing insulators made of materials of the present invention.

It is believed that the surprising results offered by the material of the present invention disclosed in Table 2 compared to the prior art material disclosed in Table 1 is due to the replacement of boric acid with zinc borate. Testing performed on insulators made in accordance with the present invention has shown that use of zinc borate in place of boric acid slows the material aging rate. Aging is a problem for the formed insulator because the aged material becomes stiffer, causing a corresponding reduction in ultimate strain capability, which affects how far the material will stretch before it breaks. Insulators made with prior art material tended to crack during motor ignition due to the reduction in strain capability that occurred during aging. A crack in the insulator forms a pathway for high-pressure and high-temperature combustion gases to exit the motor in an unplanned area. This condition invariably results in a catastrophic motor failure. The mechanism of aging in the prior art material has been extensively studied and has been found to be due to a reaction of boric acid with the phenyl and methyl alcohol groups found in the phenolic resin. This reaction effectively increases the crosslink density of the phenolic resin, which reduces strain capability of the elastomeric ablative material. This reaction does not occur with the material of the present invention, which replaces boric acid with the nonreactive zinc borate.

The material of the present invention has the additional advantage of producing less water during the cure reaction. The boric acid in the prior art material produces insulation containing about 10% water that can be released during high-temperature cure of the insulation while zinc borate in the present invention material produces insulation containing about 5% water. Care must be exercised to ensure that the water generated is removed from the insulator during cure or solubilized in the composition due to cure pressure. If the water is not removed or solubilized, it will expand to form voids in the insulator when the cure pressure is released. Such unwanted voids will act as flaws and negatively affect the structural integrity of the cured insulator. Solubilized water that functions as a plasticizer in the insulation will also diffuse out during aging. Prior art insulators containing more water will thus harden and stiffen more during aging than the insulator of the present invention that contains less water.

The ablative insulator material of the current invention in its most general form may be described as containing a vulcanizable rubber such as butadiene acrylonitrile (NBR), a phenolic resin, a flame retardant, and a suitable curing system constituent for the selected rubber. In addition to the NBR rubber of the preferred embodiment, other vulcanizable rubbers such as butadiene-styrene copolymer (SBR), polychloroprene, polyisoprene, polyurethane, polyepichlorohydrin, ethylene propylene diene monomer (EPDM), polybutadiene, chlorinated polyethylene, halobutyl rubbers, and blends of the above polymers would also be suitable for use. Other suitable flame-retardant systems in addition to zinc borate include alumina trihydrate and antimony oxide in combination with chlorinated hydrocarbons. Depending on the degree of flame retardance desired, a range of 1 to 150 PBW of flame retardant can be employed in the insulator formulation. The preferred phenolic resin is of the resole type which does not require a hardener to properly cure; however, other resins of the novolac type which require a hardener to cure can also be employed. For the novolac-type resins, a hardener such as hexamethylene tetramine should be included in the formulation at a stoichiometric level for the selected resin. For both types of resins, any of several grades available from different manufacturers can be used. Acceptable formulation levels for the phenolic resin are in the range of 1 to 300 PBW. Optionally, fibers may be included in the material formulation of the present invention. Suitable fibers include aramid, cotton (cellulose), sisal, polybenzamidazole, mineral wool, nylon, polyester, or carbon. Acceptable levels for fibers are preferably limited to a maximum of 40 PBW because their high degree of reinforcement produces a very stiff and difficult-to-process material.

Figure 5:
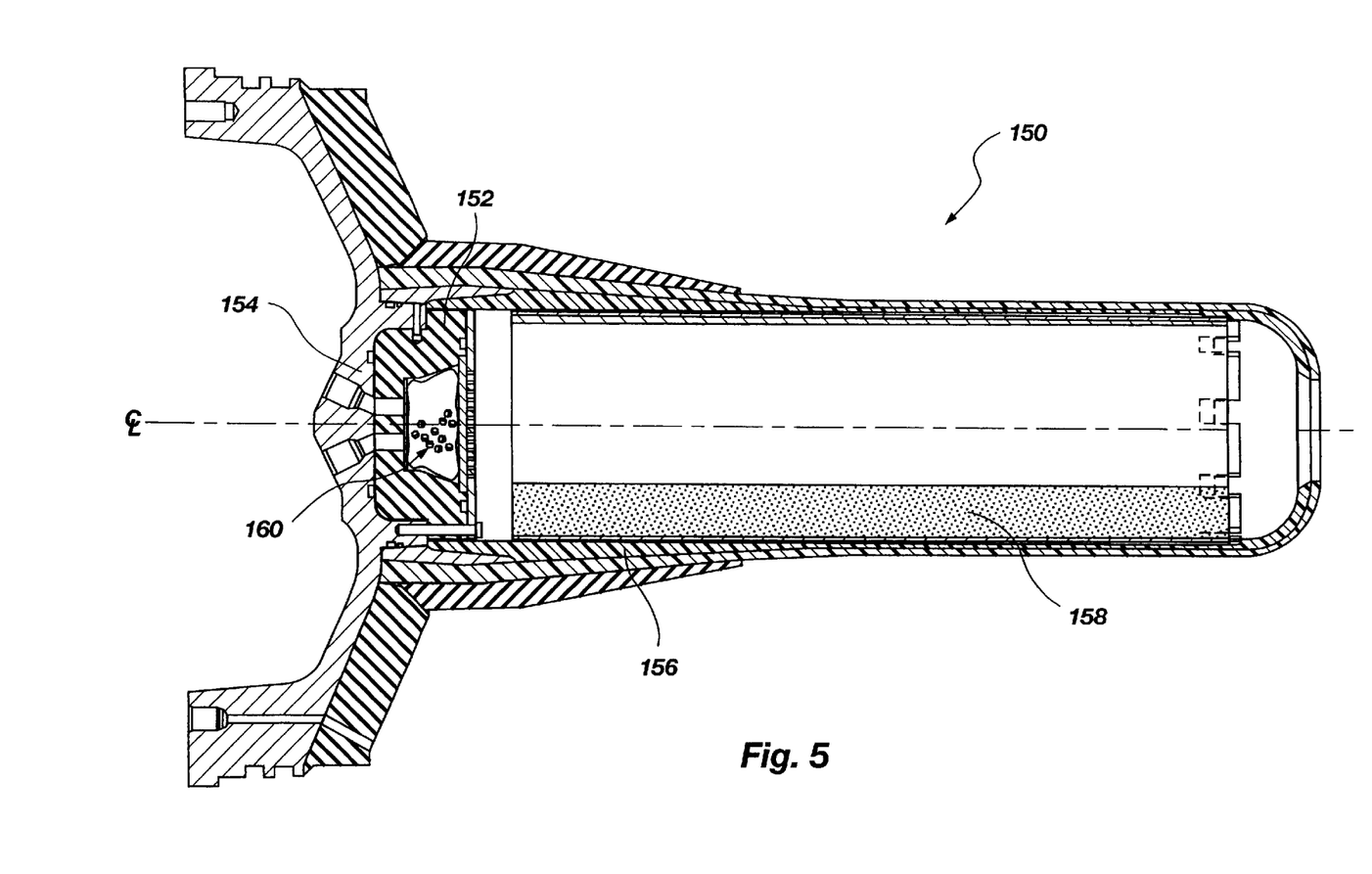
FIG. 5 is a cross-sectional view of an insulated igniter pellet cup portion of a rocket motor embodying the present invention.

The subject rubber ablative insulative material formed of the compound disclosed above has been described as being particularly suitable for use in providing insulators that can withstand the high temperatures, high pressures, and erosive environments in dome regions of open-ended rocket motors. However, the subject insulative material of the present invention is not limited to such a specific application and can be used to insulate other components and portions of rocket motors. For example, FIG. 5 depicts an igniter assembly 150 having an igniter pellet cup 152 of a rocket motor in which the subject ablative insulative material is suitable for use in forming pellet cup 152 which contains and insulates the forward closure 154 and the interior of the igniter bottle 156. Igniter pellet cup 152 is formed from patterns cut from calendered sheets as described previously and can be laid into a mold and cured. Bonded solid propellant igniter grain is designated as 158 and igniter $BKNO_3$ pellets designated as 160.

Figure 6:
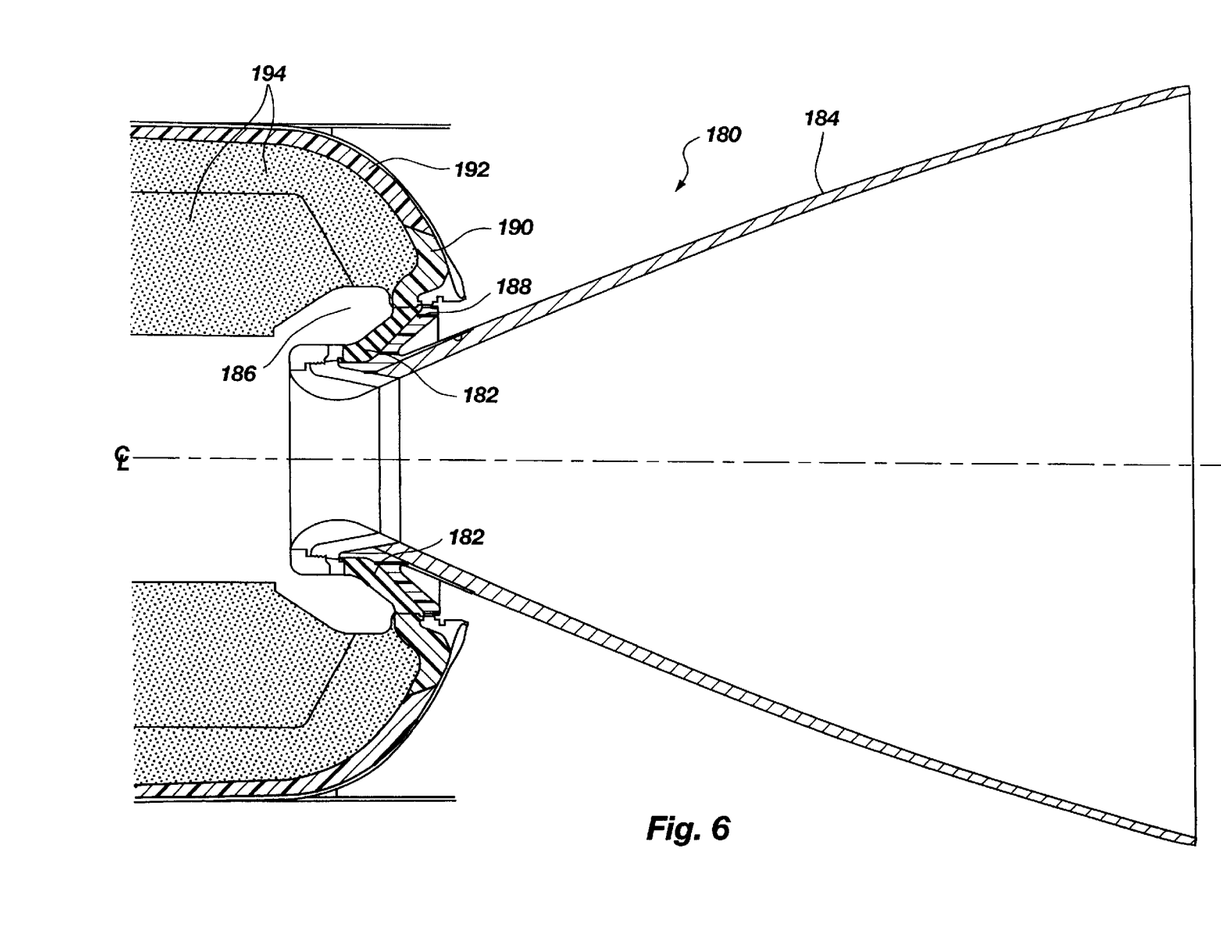
FIG. 6 is a cross-sectional view of an insulated nozzle of a rocket motor having a stationary steel shell embodying the present invention.

Another application particularly suitable for using the ablative insulative material of the present invention is for use as a stationary nozzle shell insulator within such a motor as shown in FIG. 6 of the drawings. Nozzle stationary shell insulator 182 is likewise formed of sheet material which can either be molded and then bonded to stationary shell 188 or, optionally, hand laid in place, vacuum bagged, cured and machined to final contours in the manner discussed above with respect to constructing, curing and bonding dome insulators 86 and 118 in dome shells 80 and 110, respectively. The open cavity 186 adjacent to the stationary shell 188 and bonded to aft dome insulator premold 190, typically comprising an aramid-filled EPDM material, can experience environments similar to those of the open-ended aft dome geometry previously cited. This is particularly true when nozzle exit cone 184 is vectored for a sustained period of time during the firing of the rocket motor 180. Chamber insulation 192 is typically formed of an aramid-filled EPDM material. Solid propellant grain is designated at 194. Furthermore, the use of the ablative material of the present invention need not be limited specifically to rocket motors. It can be used in other applications within and outside the aerospace industry wherever there is a need for such a material that can withstand the rigors of the high-temperature, high-pressure, and erosive environments caused by exposure to combusting fuels.

Those skilled in the art will understand and appreciate that the present invention as defined by the following claims is not to be limited by the particular details set forth in the above-detailed description. There are many variations possible without departing from the spirit and scope of the claims.

What is claimed is:

1. A method of constructing an internally insulated metal dome structure of an open-ended rocket motor, comprising:
   disposing a shear-ply layer formed of a preselected curable elastomeric material onto at least a selected portion of an inner surface of a dome structure;
   curing and bonding the shear-ply layer to the at least a selected portion of the inner surface of the dome structure;

preforming a first dome insulator of a phenolic composite material comprising fibers impregnated with a preselected curable resin and generally having an outer surface and an inner surface;

precuring the first dome insulator;

machining at least a portion of the first dome insulator;

positioning and bonding the machined portion of the first dome insulator onto a selected portion of an inner surface of the shear-ply layer, the first dome insulator positioned and bonded onto the inner surface of the shear-ply layer such that the shear-ply layer extends slightly forward of the first dome insulator;

forming in situ a second dome insulator onto at least a portion of the inner surface of the dome structure and onto at least a portion of the inner surface of the shear-ply layer longitudinally proximate to the first dome insulator by laying up a sheet material comprising acrylonitrile butadiene rubber, zinc borate, a curable resin, tetramethyl thiuram disulfide, and stearic acid; and bonding the second dome insulator onto the at least a portion of the inner surface of the dome structure and onto the at least a portion of the inner surface of the shear-ply layer.

2. The method of claim 1, further comprising abutting the second dome insulator against the first dome insulator to form a bond interface, forming in situ the second dome insulator upon a portion of the shear-ply layer and bonding the second dome insulator thereto.

3. The method of claim 2, further comprising applying an adhesive at the bond interface formed between the first and second dome insulators.

4. The method of claim 1, further comprising precoating the at least a portion of the inner surface of the dome structure onto which the second dome insulator is to be formed in situ with an adhesive.

5. The method of claim 1, wherein each of the curing of the shear-ply layer, the precuring of the first dome insulator, and the bonding of the second dome insulator are completed at a preselected elevated temperature and at a preselected pressure.

6. The method of claim 1, wherein a maximum parts by weight of the constituents of the material of which the second dome insulator is formed is approximately:

acrylonitrile butadiene rubber—100;

zinc borate—80;

phenol formaldehyde resin—120;

zinc oxide—5;

tetramethyl thiuram disulfide—3; and stearic acid—2.

7. The method of claim 1, further comprising providing the sheet material for the second dome insulator in calendered sheet form.

8. The method of claim 7, further comprising providing the sheet material of the second dome insulator in calendered sheet form having a thickness range of approximately 0.03 inch (0.8 mm) to approximately 0.25 inch (6.4 mm).

9. The method of claim 1, further comprising curing the shear-ply layer at an elevated temperature and at a preselected pressure after the shear-ply layer has been disposed onto the at least a selected portion of the inner surface of the dome structure.

10. The method of claim 1, further comprising curing the first dome insulator after it has been preformed about a mandrel at a preselected elevated temperature and at a preselected pressure.

11. The method of claim 1, further comprising curing the second dome insulator after it has been formed in situ onto the at least a portion of the inner surface of the dome structure at a preselected elevated temperature and at a preselected pressure.

12. The method of claim 11, wherein the curing of the second dome insulator further comprises vacuum bagging the dome structure, including the shear-ply layer, the first dome insulator, and the second dome insulator formed in situ within the dome structure, and placing the dome structure within an autoclave.

13. The method of claim 1, wherein the sheet material of which the second dome insulator is formed further comprises fibrous elements.

14. The method of claim 13, wherein at least a portion of the fibrous elements comprise at least one of the group consisting of aramid, cotton, cellulose, sisal, polybenzamidazole, mineral wool, nylon, carbon and polyester fibers.

15. A method of constructing an internally insulated metal dome structure of an open-ended rocket motor, comprising:

disposing a shear-ply layer formed of a preselected elastomeric material onto at least a selected portion of an inner surface of a longitudinally extending dome structure;

curing and bonding the shear-ply layer to the at least a selected portion of the inner surface of the dome structure;

preforming a first dome insulator of a phenolic composite material comprising fibers impregnated with a preselected curable resin and generally having an outer surface and an inner surface;

precuring the first dome insulator;

machining at least a portion of the first dome insulator;

positioning and bonding the machined at least a portion of the first dome insulator onto a selected portion of an inner surface of the shear-ply layer, the first dome insulator positioned and bonded onto the inner surface of the shear-ply layer such that the shear-ply layer extends slightly forward of the first dome insulator;

forming in situ a second dome insulator onto at least a portion of the inner surface of the dome structure and onto at least a portion of the inner surface of the shear-ply layer longitudinally proximate to the first dome insulator by laying up a sheet material comprising a curable rubber, a flame retardant, a phenolic resin, and at least one curing system constituent; and bonding the second dome insulator onto at least a portion of the inner surface of the dome structure and onto at least a portion of the inner surface of the shear-ply layer.

16. The method of claim 15, further comprising abutting the second dome insulator against the first dome insulator to form a bond interface and forming in situ the second dome insulator upon a portion of the shear-ply layer and bonding the second dome insulator thereto.

17. The method of claim 16, further comprising applying an epoxy adhesive at the bond interface formed between the first and second dome insulators.

18. The method of claim 15, further comprising precoating the at least a portion of the inner surface of the dome structure onto which the second dome insulator is to be formed in situ with an adhesive.

19. The method of claim 15, wherein each of the curing of the shear-ply layer, the precuring of the first dome insulator, and the bonding of the second dome insulator are completed at a preselected elevated temperature and at a preselected pressure.

20. The method of claim 15, wherein the maximum parts by weight of the constituents comprising the material of which the second dome insulator is formed is approximately:
curable rubber—100;
flame retardant—80;
phenolic resin—120; and
at least one curing system constituent—10.

21. The method of claim 15, further comprising providing the sheet material for the second dome insulator in calendered sheet form.

22. The method of claim 21, further comprising providing the sheet material of the second dome insulator in calendered sheet form having a thickness range of approximately 0.03 inch (0.8 mm) to approximately 0.25 inch (6.4 mm).

23. The method of claim 15, further comprising curing the shear-ply layer at an elevated temperature and at a preselected pressure after the shear-ply layer has been disposed onto the at least a selected portion of the inner surface of the dome structure.

24. The method of claim 15, further comprising curing the first dome insulator after it has been preformed about a mandrel at a preselected elevated temperature and at a preselected pressure.

25. The method of claim 15, further comprising bonding the second dome insulator after it has been formed in situ onto the at least a portion of the inner surface of the dome structure.

26. The method of claim 15, wherein: the curable rubber comprises at least one from a group consisting of butadiene acrylonitrile (NBR), ethylene propylene diene monomer (EPDM), butadiene styrene (SBR), polychloroprene, polyisoprene, polyurethane, polyepichlorohydrin, polybutadiene, chlorinated polyethylene, halobutyl rubbers, and blends thereof; the flame retardant comprises at least one selected from the group consisting of alumina trihydrate, zinc borate, and antimony oxide in combination with a chlorinated hydrocarbon; the phenolic resin comprises at least one selected from the group consisting of a resole type and a novolac type: and the at least one curing system constituent is selected to be appropriate for the curable rubber.

27. The method of claim 15, wherein at least one of the shear-ply layer and the sheet material of the second dome insulator comprises elements selected from the group consisting of silica and aramid.

\* \* \* \* \*

UNITED STATES PATENT AND TRADEMARK OFFICE
CERTIFICATE OF CORRECTION

PATENT NO.    : 6,554,936 B1                                                Page 1 of 1
DATED         : April 19, 2003
INVENTOR(S)   : Gary S. Metcalf and William E. White It is certified that error appears in the above-identified patent and that said Letters Patent is hereby corrected as shown below:

Column 2,
Line 44, change "done like ewise" to -- dome likewise --

Column 3,
Line 34, change "tot he" to -- to the --

Column 7,
Line 35, change "novolac Epocy" to -- Novolac Epoxy --

Signed and Sealed this

Twenty-sixth Day of August, 2003

JAMES E. ROGAN
*Director of the United States Patent and Trademark Office*